United States Patent Office 3,575,951
Patented Apr. 20, 1971

3,575,951
REACTION OF SINGLET OXYGEN WITH RAW MATERIALS FROM NAVAL STORES
Walter H. Schuller and Ray V. Lawrence, Lake City, Fla., assignors to the United States of America as represented by the Secretary of Agriculture
No Drawing. Filed Nov. 14, 1968, Ser. No. 777,549
Int. Cl. C01f 1/00
U.S. Cl. 260—97.5
9 Claims

ABSTRACT OF THE DISCLOSURE

Levopimaric acid transannular peroxide and a plurality of mixed peroxides were prepared by the reaction of singlet oxygen with levopimaric acid, pine gum, gum rosin, the sodium salt of pine gum, partially neutralized gum rosin, tall oil rosin, wood rosin, and other naval stores products.

---

A non-exclusive, irrevocable, royalty-free license in the invention herein described throughout the world for all purposes of the United States Government, with the power to grant sublicenses for such purposes, is hereby granted to the Government of the United States of America.

This invention relates to a novel singlet oxygen process for the preparation of levopimaric acid transannular peroxide as well as mixed peroxides from pine gum, gum rosin, the sodium salt of pine gum, partially neutralized gum rosin, tall oil rosin, wood rosin, and other naval stores products. All of these peroxides are useful as initiators for the polymerization of styrenated unsaturated polyester laminating resins used in the manufacture of boats, automobile bodies, construction panels, and the like. Another use is the polymerization of rosins and ester gums using these peroxides (see U.S. Pat. 3,269,998). Another embodiment of the invention involves the bleaching of crude tall oil and tall oil fatty acids using singlet oxygen.

Levopimaric acid transannular peroxide and mixed peroxides from naval stores starting materials have been made previously by means of the process of photosensitized oxidation (see U.S. Pats. 2,899,463; 2,996,515; 3,268,621; and 3,230,235). This involves aerating and irradiating (with visible light) a solution of the resin acid or resin acid mixture (rosin) in which solution is dissolved a sensitizing dye such as rose bengal [Process (a) below].

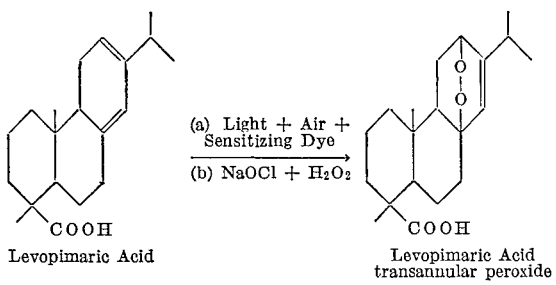

Levopimaric Acid      Levopimaric Acid transannular peroxide (a) Light + Air + Sensitizing Dye
(b) NaOCl + H₂O₂

We have now found that levopimaric acid transannular peroxide can be made via the process of singlet oxygen (cf. C. S. Foote (S. Wexler, and W. Ando, Tetrahedron Letters, 46, 4111 (1965)). This involves the addition of sodium hypochlorite to a solution of the resin acid or rosins containing hydrogen peroxide. The reaction of sodium hypochlorite with hydrogen peroxide forms singlet oxygen (cf. Foote et al.) which in turn reacts with the resin acid to give a transannular peroxide [Process (b) above].

The new process involving singlet oxygen can be carried out in various solvents. The one of choice is methanol.

An excess of reagents is used as some of the singlet oxygen is lost by reversion to ground state oxygen which is not reactive. About a 50–1000% molar excess of hydrogen peroxide based on the resin acid content can be used. We prefer a molar excess in the range of about 300–600%. About a 50–1000% molar excess of sodium hypochlorite based on the resin acid can be used. We prefer a molar excess in the range of 250–500%.

In the case of levopimaric acid transannular peroxide, precautions must be taken to minimize a subsequent reaction of the peroxide to the hydroxyenone (cf. R. N. Moore and R. V. Lawrence, J. Am. Chem. Soc., 81, 458 (1959)) which takes place in the presence of base. It has been found that

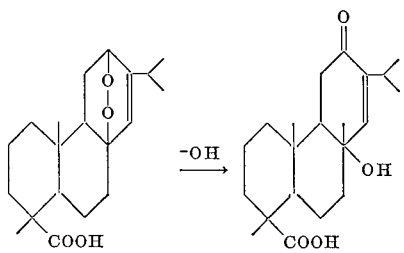

if the sodium hypochlorite is added in a period of 10–30 minutes followed by immediate acidification, the formation of hydroxyenone is greately minimized. In addition, the temperature must be held to a minimum (10°–25° C.) during the reaction in order to minimize conversion to the hydroxyenone. The concentration of hydrogen peroxide added to the alcohol solution of the rosin can be varied from 20% to 50%. We prefer 50% in many cases because it keeps the amount of water present to a minimum. (The resin acids are very insoluble in water.) The concentration of the sodium hypochlorite added can be varied from 0.5 N to 3.0 N. We prefer 3 N in many cases as, again, it keeps the amount of water present to a minimum.

With pine gum, a dilute solution of 5 g. of pine gum in 300 ml. of methanol works satisfactorily. However, it is difficult to raise the concentration of pine gum as it is insoluble in the reaction mixture. This problem has been solved by preparing the sodium salt of the resin acids of pine gum. This sodium salt is free of turpentine and of neutrals and is soluble in the reaction mixture when scaled up.

Gum rosin can also be run in dilute solution (5 g. gum rosin in 300 ml. of methanol). Again, the rosin concentration cannot be raised to a very high level due to its insolubility in the reaction mixture. In addition, the concentration of levopimaric acid in rosin is practically nil. Levopimaric acid is one of the most reactive acids in this reaction and is present to the extent of 20–35% (resin acids basis) in pine gum. This problem has been solved by using partially neutralized rosin, described by V. M. Loeblich and R. V. Lawrence, Ind. & Eng. Chem., 50, 619 (1958). This rosin is prepared from pine gum by neutralizing a large portion of the resin acids with base before steam distilling off the turpentine. As a result, the greater part of the levopimaric acid remains intact in the resulting rosin salt. This material, referred to as partially neutralized rosin, can be used in the singlet oxygen reaction and the reaction scaled up while still obtaining a clear solution throughout. The levopimaric acid present reacts to give a product high in peroxide content.

The peroxide content of the products made as described above is about in the same range as the peroxide content of the products made from pine gum via photosensitized oxidation as described in the patents cited. However, the product made via the singlet oxygen process is pure white in color, free flowing, and stable on storage. In addition, the process involved in the singlet oxygen reaction is a very simple one and readily carried out without the necessity of obtaining any special or unusual equipment.

Tall oil fatty acids when reacted with singlet oxygen in the manner described above do not develop any measurable amount of peroxide content but it is bleached to a very pale yellow oil. This bleaching is a desirable result in the industry. It should be pointed out that the photosensitized oxidation of tall oil fatty acids gives a product containing a peroxide content of about 0.38 mole of peroxide/mole of fatty acid. Thus, singlet oxygen does not in every case give the same product as is obtained on photosensitized oxidation. Crude tall oil, reacted as described above with singlet oxygen develops a small amount of peroxide content but most important of all, the black crude material is bleached to a light yellow fluid oil. Again, this is a very desirable result in the industry. Finally, tall oil rosin, when reacted as described above (5 g. in 300 ml. of methanol) develops a modest peroxide content and is useful as an initiator for the polymerization of styrenated unsaturated polyester laminating resins.

In general, the invention can best be described as a process for producing certain peroxides from the reaction of singlet oxygen with materials from naval stores, as illustrated by the preparation of levopimaric acid photoperoxide from levopimaric acid. Thus, the process is carried out by:

(a) mixing levopimaric acid in a sufficient quantity of methanol to yield a slurry,
(b) cooling the slurry to about 10° to 20° C.,
(c) adding a concentrated hydrogen peroxide solution (25–50%) to the cooled slurry so that the hydrogen peroxide to levopimaric acid molar ratio will be respectively about 3.0 to 1,
(d) adding to the oxidized slurry, over a 20–45 minute period of vigorous stirring, and maintaining the temperature of the slurry below 25° C., a quantity of aqueous 0.5 to 5.0 normal sodium hydrochlorite (pH about 11.7) so that the sodium hypochlorite to levopimaric acid ratio will be respectively about 2.5 to 1,
(e) adding a sufficient quantity of a water-immiscible solvent for the peroxide,
(f) adding promptly thereafter sufficient dilute phosphoric acid to lower the pH to about 1.5,
(g) extracting the solution with the water-immiscible solvent for the peroxide,
(h) water-washing and drying the product over a suitable dessicant, and
(i) removing the solvent by distillation, preferably under reduced pressure, to give the product as a residue.

The embodiment of this invention which relates to the new bleaching process can be illustrated by the procedure applicable to bleaching tall oil fatty acids with singlet oxygen. Thus, this embodiment comprises:

(a) charging a reaction vessel with a quantity of distilled tall oil fatty acids of color equal to USDA rosin grade WW and sufficient methanol to give a solution,
(b) cooling the solution to below 25° C.,
(c) adding a 0.5 to 6.0 molar excess based on the tall oil fatty acids present of concentrated hydrogen peroxide solution (25–50%) to the cooled solution from (b),
(d) adding over a 20–90 minute interval with vigorous stirring and aqueous 3.0 to 5.0 normal solution of sodium hypochlorite in an amount equal to a 0.5 to 6.0 molar excess, based on the moles of tall oil fatty acids present, maintaining the temperature of the oxidized solution below about 25° C.,
(e) adding sufficient water-immiscible solvent for the tall oil fatty acids,
(f) adding promptly thereafter sufficient dilute phosphoric acid to lower the pH to about 1.5,
(g) extracting the solution with the water immiscible solvent for the tall oil fatty acids,
(h) water-washing and drying the product over a suitable dessicant, and
(i) stripping the solvent, preferably under reduced pressure, to give a pale yellow oil of color equal to USDA rosin grade of X and containing no measurable peroxide content.

EXAMPLE 1

All optical rotations and ultraviolet absorption spectra in this and all subsequent examples were measured in 95% ethanol.

Reaction of levopimaric acid with singlet oxygen

A slurry of 100 g. (0.332 mole) of levopimaric acid in 300 ml. of methanol containing 89 ml. of 22.4 N hydrogen peroxide (0.995 mole; 3/1 mole ratio) is charged to a round bottomed 3 liter flask equipped with a mechanical stirrer, a thermometer, and a dropping funnel which is terminated in a capillary tip extending far below the surface of the liquid. A means for allowing the generated oxygen to escape is provided. A large external ice bath is used for cooling. When the slurry has been cooled to 10° C., a solution of 2020 ml. of 0.83 N sodium hypochlorite (0.83 mole; 2.5/1 mole ratio) of pH 11.7 is added rapidly, during vigorous stirring. The addition is completed in 30 minutes; final pH 11.0. The temperature is not allowed to exceed 25° C. during the addition. All of the solid dissolves during the addition of sodium hydrochlorite. A large excess of 3 M phosphoric acid is *immediately* added to pH 1, to prevent isomerization to the hydroxyenone (cf. Moore, R. N., and Lawrence, R. V., J. Am. Chem. Soc., 81, 458 (1959)). The solution is ether extracted 3 times, the ether is washed with water 3 times, is dried over anhydrous sodium sulfate and is stripped under reduced pressure; yield is essentially quantitative; $[\alpha]_D^{25}+80°$ (c. 1.2) essentially no characteristic absorption from 22–320 m$\mu$; peroxide analysis [cf. W. H. Schuller, J. C. Minor, R. V. Lawrence, Ind. & Eng. Chem., Prod. Res. & Dev., 3, 97 (1964)] indicates 1.0 mole of peroxide present/mole of resin acid; reaction with excess base overnight gives $\lambda_{max}$ 234 m$\mu$ ($\alpha$ 19.1) and $[\alpha]_D^{25}+14.5°$ [Lit. (R. N. Moore and R. V. Lawrence, J. Am. Chem. Soc., 81, 458 (1959)) gixes $\lambda_{max}$ 234 m$\mu$ ($\alpha$ 20.7) and $[\alpha]_D^{25}+27°$ for hydroxyenone]. The crude peroxide is dissolved in 200 ml. of 95% ethanol and a solution of 32.4 g. of 2-methyl-2-amino-1-propanol in 50 ml. of 95% ethanol is added. The salt is collected; yield 106 g. (75.5%); $[\alpha]_D^{25}+67.8°$ (c. 1.2). The salt is recrystallized from 95% ethanol to give 58.3 g. (41.6%) of needles of $[\alpha]_D^{25}+78.7°$ (c. 0.82) [Lit. (cf. R. N. Moore, and R. V. Lawrence, J. Am. Chem. Soc., 80, 1438 (1958)) gives $[\alpha]_D^{25}+77.1°$]. The salt is regenerated in ether solution using the calculated amount of phosphoric acid and is recrystallized once from aqueous ethanol; yield 46.9 g. (33%) of levopimaric acid transannular peroxide (II); $[\alpha]_D^{25}+101.5°$ (c. 1.8); M.P. 158°–160° C. dec. [Lit. (see R. N. Moore and R. V. Lawrence, J. Am. Chem. Soc., 80, 1438 (1958)) gives M.P. 156–168° C. dec. and $[\alpha]_D^{25}+101°$]; infrared spectrum (Nujol mull) is essentially identical to that of an authentic sample prepared via the photosenstized oxidation of levopimaric acid.

If the levopimaric acid is reacted essentially as described above except that the sodium hyprochlorite used is adjusted to pH 9.7 with dilute phosphoric acid before being standardized, an undesirable result is obtained. This solution is used immediately although found to be stable for 23 hours at this pH. The final reaction mixture is of pH 7.3. The resulting product contains only 0.17 mole of peroxide/mole of resin acid; $[\alpha]_D^{25}-63.5$ (c. 2.3) and $\lambda_{max}$ 242 ($\alpha$ 46.5), 274 ($\alpha$ 4.7), 284 ($\alpha$ 4.1) m$\mu$.

EXAMPLE 2

Reaction of other raw materials with singlet oxygen

Procedure A: A solution of 100 g. of the starting material in 300 ml. of methanol is cooled to 10° C. and a 300% molar excess of 50% hydrogen peroxide is added.

A 250% excess of a 3.0 N aqueous solution of sodium hypochlorite is added in the time indicated below, keeping the temperature *below* 25° C., during vigorous stirring. Ether is then immediately added followed at once by an excess of 5 M phosphoric acid to about pH 1–2. The solution is ether extracted five times, is water washed three times, is dried over sodium sulfate, and is stripped under reduced pressure. The yield is about 87–97% of theory. The peroxide content and the nature of the product is as indicated below.

Pine gum: 20 min., 0.45 mole peroxide/mole of resin acids; white friable solid. The pin gum is converted to the sodium salt and run in this state in order to keep all solids in solution throughout the run. The process for preparing the sodium salt as described in a subsequent patent application by N. M. Joye, Jr., and R. V. Lawrence, is as follows. To a filtered solution of 350 grams of pine gum in 1 liter of isoctane was added dropwise with stirring 65 ml. of a 50% aqueous sodium hydroxide solution and the mixture was refrigerated. The next day the solid mass of crystals was filtered and dried in vacuo over Drierite; yield was 245 grams.

Partially neutralized gum rosin: 28 min.; 0.47 mole peroxide/ mole resin acid; white fluffy friable solid. This gum rosin is partially neutralized to the extent of 45% and prepared according to the method of Loeblich and Lawrence (see V. M. Loeblich and R. V. Lawrence, Ind. & Eng. Chem. 50, 619 (1958)); $[\alpha]_D^{25}$ —47.7 (c. 1.07); acid No. 86.0; levopimaric acid, 38%.

Procedure B: Five g. of the material to be oxidized is disolved in 300 ml. of methanol, cooled to 10° C., and a 600% molar excess of 50% hydrogen peroxide added. A 50% molar excess of a 3 N aqueous solution of sodium hypochlorite is dripped in during the period of time indicated below and with vigorous stirring. The temperature during the addition is held below 13° C. Ether and water are then immediately added, followed at once by an excess of 5 M phosphoric acid to about pH 1.5. The solution is ether extracted three times, is water washed three times, is dried over sodium sulfate, is stripped under reduced pressure, and is dried in vacuo over Drierite; yield essentially quantitative. Peroxide content is as indicated below. Appearance of product is as indicated below.

Pine gum: 10 min.; 0.53 mole peroxide/mole resin acid; friable white solid.

Gum rosin: 30 min.; 0.36 mole peroxide/mole resin acid; friable white solid.

Crude tall oil (color equal to USDA rosin grade D): 90 min.; 0.10 mole peroxide/mol resin acid; light yellow oil (color equal to USDA rosin grade I).

Tall oil fattly acids (distilled) (color equal to USDA rosin grade WW.): 20 min.; no peroxide content; very pale yellow oil (color equal to USDA rosin grade X).

Tall oil rosin: 90 min.; 0.19 mole peroxide/mole resin acid; white friable solid.

Partially neutralized gum rosin: (see Procedure A for preparation of this material): 15 min.; 0.56 mole peroxide/mole resin acid; white friable solid.

Wood rosin: 20 min.; 0.33 mole peroxide/mole of resin acid; friable solid.

Dimerized rosin: (Product produced by sulfuric acid polymerization of wood rosin. Contains about 80% dimer acid. The commercial product Dymerex gave essentially the same results.) 13 min.; 0.25 mole peroxide/mole of resin acid dimer; friable solid.

EXAMPLE 3

To 10 g. of a styrenated unsaturated polyester similar to those described in the publication by N. J. Halbrook, R. V. Lawrence, M. D. Dalluge, and G. A. Stein, Ind. & Eng. Chem., Prod. Res. & Dev., 2, 182–185 (1963) is added with stirring, 0.50 g. (5% on a weight basis) of levopimaric acid transannular peroxide. The solution is placed in a beaker and set in an oven at 130° C. A blank is run consisting of 10 g. of the same styrenated unsaturated polyester in an open beaker. After 25 minutes, the blank or control shows no visible change while the solution containing the peroxide is converted to a tough resin having a Barcol hardness of 34.

EXAMPLE 4

The test described in Example 3 is repeated with the exception that the peroxide used is that made as described in Example 2 from the sodium salt of pine gum (0.45 mole peroxide/mole resin acid). After 30 minutes at 130° C., the blank shows no change while the styrenated unsaturated polyester containing the peroxide is a tough polymer having a Barcol hardness of 32.

EXAMPLE 5

The test described in Example 3 is repeated with the exception that the peroxide used is that made as described in Example 2 from tall oil rosin (0.19 mole peroxide/ mole resin acid). After 65 minutes the blank was a fluid gel and the sample containing peroxide was a spongy gel.

EXAMPLE 6

The test described in Example 3 is repeated with the exception that the peroxide used is that made as described in Example 2 from wood rosin (0.33 mole peroxide/mole resin acid). After 15 minutes, the blank exhibits no change while the sample containing perioxide is a hard, tough resin having a Barcol hardness of 30.

EXAMPLE 7

The test described in Example 3 is repeated with the exception that the peroxide used is that made as described in Example 2 from Dymerex (0.25 mole peroxide/mole dimer). After 15 minutes the blank exhibits no visible change while the sample containing peroxide was a tough resin.

EXAMPLE 8

The test described in Example 3 is repeated with the exception that the peroxide used is that made as described in Example 2 from partially (45%) neutralized rosin (0.47 mole peroxide/mole resin acid). After 15 minutes at 130° C. the blank exhibits no visible change while the sample containing peroxide is a hard, tough polymer.

EXAMPLE 9

Test tubes are filled with 15 ml. each of the following vinyl monomers: methacrylic acid, acrylic acid, methyl methacrylate, and styrene and the tubes are stoppered. Another series of test tubes containing 15 ml. each of the same monomers plus 3% by weight of the peroxide prepared from 45% partially neutralized rosin with singlet oxygen (0.47 mole peroxide/mole resin acid present, Example 2) is added to each tube and dissolved by stirring. All tubes are stoppered. All eight tubes are placed in a hot air circulating oven held at 95° C. and observed. After 30 minutes, the methacrylic acid plus catalyst is a hard solid cake of polymer while the methacrylic acid blank is essentially unchanged. After 120 minutes, the methyl methacrylate tube plus catalyst is a very viscous, stiff, non-pourable polymer while the methyl methacrylate blank is only slightly viscous and quite fluid. At the same period of time (120 minutes) the acrylic acid plus catalyst sample is a very viscous, stiff, non-pourable polymer while the acrylic acid blank is still very fluid. The temperature was then raised to 130° C. for 85 minutes and the styrene plus catalyst turns to a polymeric rubbery gel. The styrene blank is still very fluid.

We claim:
1. A process for preparing peroxides from naval stores materials by reaction with singlet oxygen comprising:
 (a) preparing a methanol slurry of a naval stores material selected from the group consisting of levopimaric acid, the sodium salt of pine gum resin acids, partially neutralized rosin containing over 10% levopimaric acid, pine gum, gum rosin, tall oil rosin, wood rosin, and dimerized rosin;

(b) cooling the slurry to about 5° to 25° C.;

(c) adding to the cooled slurry an amount of concentrated hydrogen peroxide solution to form a reaction mixture containing a 50–1000% molar excess of hydrogen peroxide with respect to the naval stores material in said reaction mixture;

(d) then slowly adding, with vigorous stirring, while maintaining the temperature of the reaction mixture below 25° C., sufficient aqueous 0.5 to 3 normal sodium hypochlorite with respect to the naval stores material to form a peroxide of said naval stores material in the reaction mixture;

(e) adding to the reaction mixture an amount of water-immiscible solvent for the peroxide of the naval stores material sufficient to dissolve said peroxide;

(f) thereafter adding sufficient dilute phosphoric acid to lower the pH to about 1.5; and (g) recovering the peroxide of the naval stores material from the water-immiscible solution thereof.

2. The process of claim 1 wherein the naval stores material is levopimaric acid.

3. The process of claim 1 wherein the naval stores material is the sodium salt of pine gum resin acids.

4. The process of claim 1 wherein the naval stores material is partially neutralized rosin containing over 10% levopimaric acid.

5. The process of claim 1 wherein the naval stores material is pine gum.

6. The process of claim 1 wherein the naval stores material is gum rosin.

7. The process of claim 1 wherein the naval stores material is tall oil rosin.

8. The process of claim 1 wherein the naval stores material is wood rosin.

9. The process of claim 1 wherein the naval stores material is dimerized rosin.

References Cited

UNITED STATES PATENTS

| | | | |
|---|---|---|---|
| 2,996,515 | 8/1961 | Moore et al. | 260—340.3 |
| 3,230,235 | 1/1966 | Moore et al. | 260—340.3 |
| 3,268,621 | 8/1966 | Moore et al. | 260—861 |
| 3,269,998 | 8/1966 | Minor et al. | 260—99 |
| 3,309,351 | 3/1967 | Schuller et al. | 260—98 |
| 3,345,404 | 10/1967 | Schuller et al. | 260—514.5 |

OTHER REFERENCES

Journal of the American Chemical Society, vol. 80, pages 1438–1440 (1958).

Journal of the American Chemical Society, vol. 81, pages 458–460 (1959).

Journal of the American Chemical Society, vol. 82, pages 1734–1738 (1960).

Journal of the American Chemical Society, vol. 83, pages 2563–2570 (1961).

I & EC Product Research & Development, vol. 3, pages 97–100 (6–1964).

I & EC Product Research & Development, vol. 6, pages 266–268 (12–1967).

Tetrahedron Letters, No. 46, pages 4111–4118 (1965).

Rosin and Rosin Derivatives, Reprint of pages 780–781 and 799–800 of Encyclopedia of Chemical Technology (1953).

DONALD E. CZAJA, Primary Examiner

W. E. PARKER, Assistant Examiner

U.S. Cl. X.R.

260—99, 105, 514.5